US007064261B2

(12) United States Patent
Shao

(10) Patent No.: US 7,064,261 B2
(45) Date of Patent: Jun. 20, 2006

(54) ELECTRONIC MUSICAL SCORE DEVICE

(75) Inventor: Shu-Lan Shao, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 135 days.

(21) Appl. No.: 10/800,736

(22) Filed: Mar. 16, 2004

(65) Prior Publication Data

US 2005/0081701 A1 Apr. 21, 2005

(30) Foreign Application Priority Data

Oct. 15, 2003 (TW) .............................. 92128525 A

(51) Int. Cl.
*G10H 1/00* (2006.01)
*G09B 15/00* (2006.01)
*G09B 15/02* (2006.01)

(52) U.S. Cl. .................................. 84/477 R; 84/470 R

(58) Field of Classification Search .............. 84/470 R, 84/477 R, 478
See application file for complete search history.

(56) References Cited

U.S. PATENT DOCUMENTS 4,779,510 A * 10/1988 Van den Abbeel ........ 84/464 R
5,400,687 A * 3/1995 Ishii .......................... 84/477 R
5,689,077 A * 11/1997 Jasinski ..................... 84/477 R
5,894,100 A * 4/1999 Otsuka ...................... 84/477 R
5,913,259 A * 6/1999 Grubb et al. ................. 84/610
6,175,070 B1 1/2001 Naples et al. ................. 84/609
6,392,132 B1 * 5/2002 Uehara ...................... 84/477 R
2003/0110926 A1 6/2003 Sitrick et al. ................. 84/477

* cited by examiner

*Primary Examiner*—Jeffrey W Donels
(74) *Attorney, Agent, or Firm*—Bacon & Thomas, PLLC

(57) ABSTRACT

An electronic musical score device is disclosed. An audio unit is provided for receiving a sound signal. An audio recognition unit performs an audio frequency recognition process to the sound signal to obtain a recognized musical note. A microprocessor unit receives musical score data with a plurality of standard musical notes and at least one recognized musical note and compares the recognized musical note with the plurality of standard musical notes to find a corresponding position for the recognized musical note in the music score data, wherein the music score data is capable of segmentation into at least one page. A display unit displays at least one page of the musical score data, wherein when the recognized musical note is located at a predetermined position in at least one page of the music score data, the microprocessor unit displays another page of the musical score data.

20 Claims, 3 Drawing Sheets

ELECTRONIC MUSICAL SCORE DEVICE

BACKGROUND OF THE INVENTION

1. Field of the Invention

The present invention relates to an electronic device, and more particularly, to an electronic musical score device.

2. Description of the Prior Art

Currently, musicians need to arrange their musical scores properly before they begin to play so that it is easy for them to flip through the various pages during a performance. This, however, may distract the musicians. Alternatively, they may require another person to page through the musical scores for them, as in the case of a pianist, but this is also rather inconvenient.

Furthermore, when a musician or composer is playing, they may occasionally need to write down certain notes or modifications as they play, and then try to play the music again. There is no electronic device that can provide such automatic memorizing and annotating functionality. Another thing is that, for beginners, there is no electronic device that can help to provide the correct tones, or even rank the music played by the beginner according to a standard musical ranking. The beginner thus may miss mistakes (in notes or tempo) during his or her performance.

Therefore, it is desirable to provide an electronic musical score device to mitigate and/or obviate the aforementioned problems.

SUMMARY OF THE INVENTION

A main objective of the present invention is to provide an electronic musical score device that can automatically scroll through the musical scores.

Another objective of the present invention is to provide an electronic musical score device that can record, display and play the music played by a performer so that the performer can review his or her performance.

Another objective of the present invention is to provide an electronic musical score device that can provide a ranking functionality so as to evaluate the achievement of the performer.

In accordance with one aspect of the present invention, the electronic musical score device of the present invention includes: an audio unit for receiving a sound signal; an audio recognition unit for performing an audio frequency recognition process to the sound signal to obtain a recognized musical note; a microprocessor unit for receiving musical score data with a plurality of standard musical notes and at least one recognized musical note and comparing the recognized musical note with the plurality of standard musical notes to find a corresponding position for the recognized musical note in the music score data, wherein the music score data is capable of segmentation into at least one page, each page having a plurality of measures and each measure has at least one standard musical note; and a display unit for displaying at least one page of the musical score data, wherein when the recognized musical note is located at a predetermined position in at least one page of the music score data, the microprocessor unit displays another page of the musical score data.

In accordance with another aspect of the present invention, the electronic music score device includes: an audio unit for receiving a sound signal; an audio recognition unit for performing an audio frequency recognition process to the sound signal to obtain a recognized musical note; a page changing unit for generating a page changing control signal; a storage unit for storing musical score data and the recognized musical note, the musical score data capable of being segmented into at least one page, each page having a plurality of measures and each measure having at least one standard musical note; a microprocessor unit; and a display unit for displaying at least one page of the musical score data, wherein the microprocessor receives the page changing control signal and drives the display unit to display another page of the musical score data.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
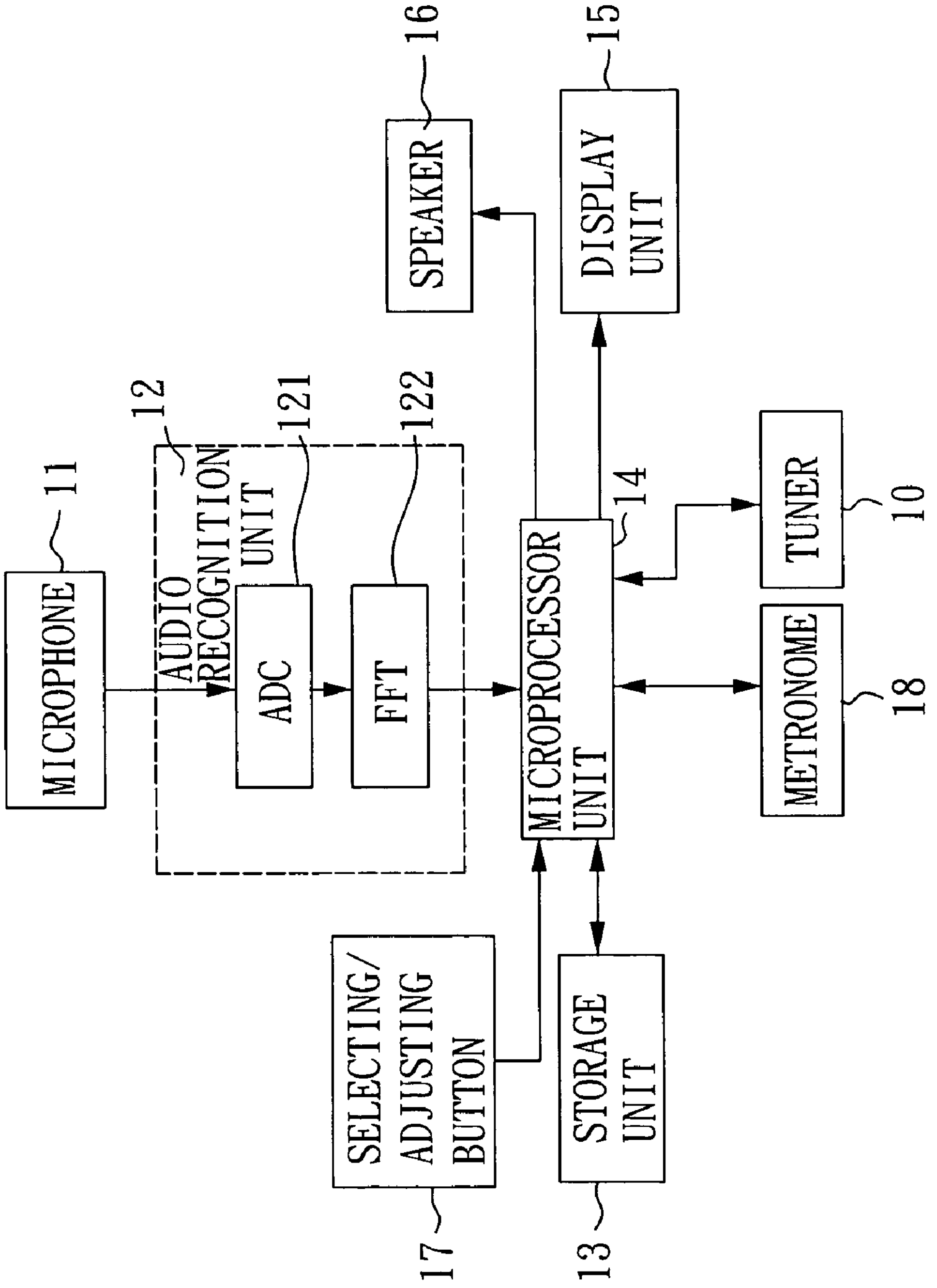
FIG. 1 is a functional block drawing for a first embodiment of the present invention.

In a first embodiment of the present invention, a pianist is taken as an example musician. Please refer to FIG. 1, which is a functional block drawing for the first embodiment of the present invention. An electronic musical scoring device of the present invention is composed of a microphone 11, an audio recognition unit 12, a storage unit 13, a microprocessor unit 14, a display unit 15, a speaker 16, at least one selecting/adjusting button 17, a metronome 18 and a tuner 10. The audio recognition unit 12 comprises an analog to digital converter 121 and a frequency domain transformer 122. The frequency domain transformer 122 is preferably to be a FFT (Fast Fourier Transform) device for performing a fast Fourier transformation.

The microphone 11 is used for receiving the music played by the performer, i.e. each tone has a corresponding audio signal and the microphone 11 receives the audio signals. The audio recognition unit 12 performs an audio recognition process to the audio signals, which means recognizing the audio signals as musical notes by their frequency. The audio recognition unit 12 uses the analog to digital convert 121 to convert the audio signals into digital signals, and then uses the frequency transformer 122 to sample the signal. Furthermore, the frequency transformer 122 can simplify the sampling point to obtain a better sample so that the frequency of the audio signal can be recognized.

In this embodiment, the storage unit 13 can be a built-in memory, a hot swappable memory card or a portable disk, and is used for storing musical composition data. The musical composition data provides a musical score for a melody and can be presented as at least one page in a musical score format. Every page of the musical score has a plurality of measures, and every measure has at least one musical note, i.e. the musical composition data is composed of the plurality of measures and musical notes. When the performer wants to play, for example, "moonlight sonata", he or she can use the selecting/adjusting button 17 to select the tune so that the display unit 15 will display the first page, or other page, of the musical score of the tune selected by the performer.

The microprocessor unit 14 is used for receiving the musical notes recognized by the audio recognition unit 12 and sequentially comparing them to the musical score data stored in the storage unit 13 with the very first musical note in the musical score. This enables determination of a corresponding position in the musical score data for the current played musical note (i.e. the current recognized musical note). When the corresponding position for the recognized musical note in the musical score data displayed in the display unit 15 is within the last few positions (such as the last musical note), the microprocessor unit 14 drives the display unit 15 to display the next page, i.e. the microprocessor unit 14 controls the page changing or scrolling movement of the display unit 15.

The microprocessor unit 14 can compare a whole section to the musical score data each time, and a buffer (not shown) is allocated in the device to store the recognized musical notes. Furthermore, the microprocessor unit 14 can also drive the display unit 15 to display the next page when the recognized musical notes are in the last measure or the second to last measure.

The tuner 10 can provide the correct notes for the instrument. In other words, the tuner stores the correct notes so that the audio recognition unit 12 recognizes the played musical notes and the microprocessor unit 14 compares the notes of the played musical notes to the correct notes stored in the tuner 10 to obtain an error value. Then the microprocessor unit 14 stores the error value in the storage unit 13 and displays the error value on the display unit 15 so that the performer can use it as a reference for tuning. The tuner can be used during the entire performance in order to serve as a reference for instrument tuning.

The electronic musical scoring device of the present invention not only can automatically page the stored musical score for the performer but also can help the performer to compose a score (that is, store the recognized musical notes) and rank the performance. The following description will explain these two functionalities.

For many composers, they frequently play the instrument freely at first, then write down the music that was played, which forces them to stop the creative playing process. Hence, the electronic musical scoring device of the present invention provides real time recording functionality. When the performer wants to use the real time recording functionality, he or she needs to set a tempo (such as a 4/4 beat) for the melody via the selecting/adjusting button, and the microprocessor unit 14 adjusts the metronome 18. When the performer starts to play, the audio recognition unit 12 recognizes the music received by the microphone 11, and the storage unit 13 stores the recognized musical notes. After playing, the performer can push the play button (not shown) to play the recognized musical notes with the tempo provided by the metronome 18 through the speaker 16, so the performer can hear his or her playing to decide if it needs any modification.

It is impossible for the beginner to tell if he or she is playing a melody correctly. Common mistakes include incorrect tempo, and wrong notes. The present invention provides a scoring functionality to help with practice. The audio recognition unit 12 recognizes the music received by the microphone 11, and the storage unit 13 stores the recognized musical notes and other related elements, such as the tempo. Afterward, the microprocessor unit 14 compares the recognized musical notes and tempos with first predetermined values and second predetermined values of the musical score stored in the storing unit 13, wherein the first predetermined values are the notes for the musical score and the second predetermined values are the tempos for the musical score.

Therefore, the microprocessor unit 14 compares the played music to at least one predetermined value of the electronic musical score and ranks the played music. The ranking means can be a percentage, such as determining how many wrong notes are played in ten measures, or using a plurality of lights to show the ranking level.

Moreover, for the non-beginner, the present invention can also provide a ranking functionality for dynamic symbols; the audio recognition unit 12 recognizes the volume change of the played music and compares it to the dynamic symbols (such as crescendo, or diminuendo) on the musical score stored in the storage unit 13. A second embodiment of the present invention is similar to the first embodiment of the present invention. The only difference is how the microprocessor unit 14 decides to page or scroll the display. The audio recognition unit 12 performs the audio frequency recognition to the audio signal received by the microphone 11 to obtain the recognized musical notes, and the microprocessor unit 14 gathers statistics of a generating speed of the recognized musical notes (i.e. a receiving speed of the microphone 11) to estimate when to page or scroll the display.

However, different performers have different ways to express the same melody, so the performance speed can vary from performer to performer. Therefore, the microprocessor unit 14 gathers statistics of a generating speed of the recognized musical notes and after a predetermined time (such as after 15 seconds) gathers statistics of a generating speed of the recognized musical notes again to find a closest performing speed and control the displaying unit 15 to page at perfect timing.

Figure 2:
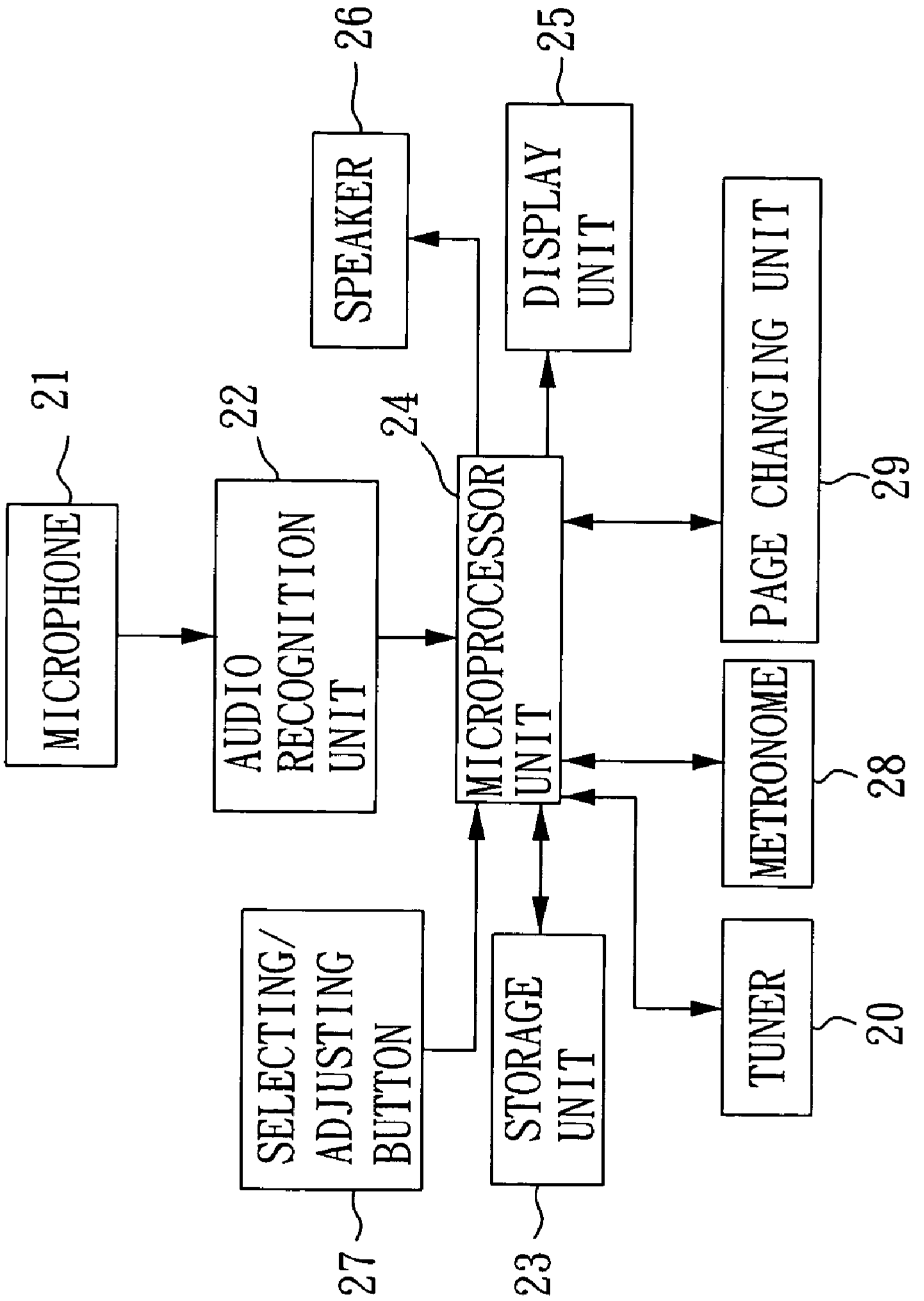
FIG. 2 is a functional block drawing for a third embodiment of the present invention.

Please refer to FIG. 2. FIG. 2 is a functional block schematic drawing for a third embodiment of the present invention, which is similar to the first embodiment. The electronic musical score device of the present invention is composed of a microphone 21, an audio recognition unit 22, a storage unit 23, a microprocessor unit 24, a display unit 25, a speaker 26, at least one selecting/adjusting button 27, a metronome 28, a tuner 20 and a page changing unit 29. The embodiment uses the page changing unit 29 to page or scroll the musical scores manually, which is different from the automatic page changing means from the first embodiment, and the following description provides more detail.

Figure 3:
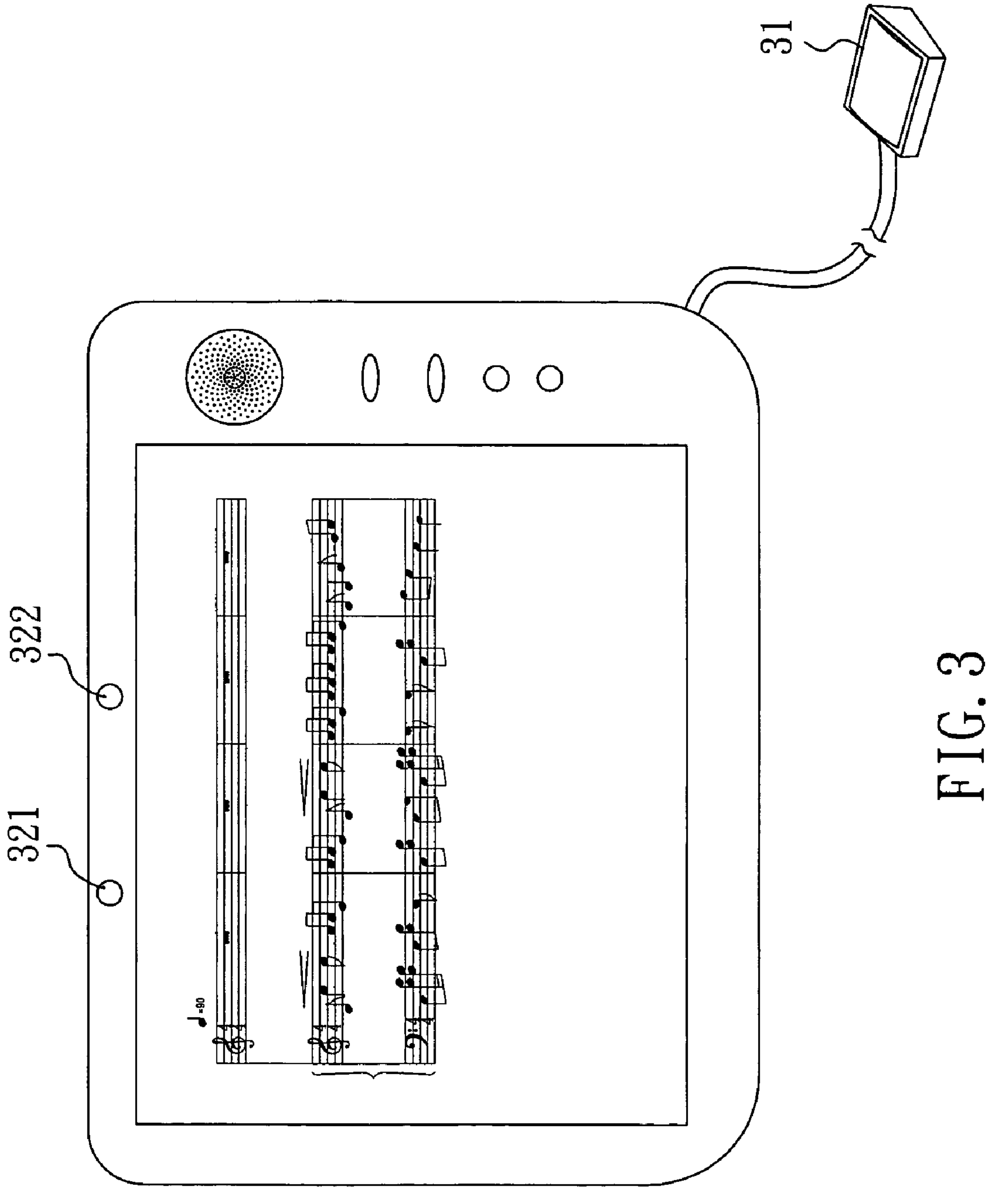
FIG. 3 depicts an exterior portion of the present invention.

The storage unit 23 is used for storing the musical score data, and the microprocessor is used for driving the display unit 25 to display the first page of the musical score data. In this embodiment, the page changing unit 29 can employ a light sensor or a touch control unit (such a button or a pedal). As shown in FIG. 3, the page changing unit 29 uses two light sensors 321, 322; when the user wants to page the display, he or she only needs to wave a hand in front of the electronic musical scoring device so that the two light sensors senses the light change time difference to generate a page changing control signal to the microprocessor unit 24, and the microprocessor unit 24 drives the display unit 25 to display another page of the musical score. Furthermore, the microprocessor unit 24 can also control the page changing direction according to the sequence that the two sensors 321, 322 sense the light change because of the hand waving direction; for example, if the hand waves to the left it may mean to page forwards; if the hand waves to the right it may mean to page backwards.

If the page changing unit 29 is a page changing button, then when the musician wants to page forward to the next page, he or she just presses the button so that the microprocessor unit 24 drives the display unit 25 to display another page of the musical score. Similarly, if the page changing unit 29 is a pedal, when the musician wants to page to the next page, he or she just steps on the pedal so that the microprocessor unit 24 drives the display unit 25 to display another page of the musical score. The page changing unit 29 can also employ a plurality of page changing buttons or a pedal with at least two states. All the other main elements (such as the microphone 21, the audio recognizing unit 22 and the metronome 28) are similar to the first embodiment, so no further description is required. Moreover, FIG. 3 shows a plurality of buttons placed on one side of the device for selecting, controlling or adjusting.

From the above description, the present invention provide an automatic page changing means and a manual page changing means, wherein the automatic page changing means can find the corresponding position for the recognized musical notes to decide when to page, and the manual page changing means can use a touch control unit or a non-touch control unit to page the musical score. Moreover, the present invention further provides an automatic recording functionality and a scoring functionality.

Although the present invention has been explained in relation to its preferred embodiment, it is to be understood that many other possible modifications and variations can be made without departing from the spirit and scope of the invention as hereinafter claimed.

What is claimed is:

1. An electronic musical score device, comprising:

an audio unit for receiving a sound signal;

an audio recognition unit for performing an audio frequency recognition process to the sound signal to obtain a recognized musical note;

a storage unit for storing the recognized musical note;

a microprocessor unit for receiving musical score data with a plurality of standard musical notes and at least one recognized musical note and comparing the at least one recognized musical note with the plurality of standard musical notes to find a corresponding position for the at least one recognized musical note in the music score data, wherein the music score data is capable of segmentation into at least one page, each page having a plurality of measures and each measure has at least one standard musical note;

a display unit for displaying at least one page of the musical score data, wherein when the at least one recognized musical note is located at a predetermined position in at least one page of the music score data, the microprocessor unit displays another page of the musical score data;

a speaker unit for playing the at least one recognized musical note stored in the storage unit under control of the microprocessor unit; and a tuner for providing a correct tune to compare to a played tune to obtain an error value, storing the error value in the storage unit and displaying the error value on the displaying unit so that a user can tune during a performance.

2. The electronic musical score device as claimed in claim 1 further comprising a storage unit for storing the music score data.

3. The electronic musical score device as claimed in claim 1, wherein the predetermined position is the last standard musical note of at least one musical score data displayed by the displaying unit.

4. The electronic music score device as claimed in claim 1, wherein the predetermined position is the last measure of at least one musical score data displayed by the display unit.

5. The electronic musical score device as claimed in claim 1, wherein the audio recognition unit has an analog to digital converter and a frequency transformer.

6. The electronic musical score device as claimed in claim 1 further comprising a metronome for generating a tempo, the microprocessor unit working with the metronome to play the recognized musical note stored in the storing unit via the speaker unit.

7. The electronic musical score device as claimed in claim 2, wherein the storage unit stores at least one predetermined ranking value, and the microprocessor unit compares the least one predetermined ranking value to the recognized musical note to generate a ranking result.

8. The electronic music score device as claimed in claim 7, wherein the at least one predetermined ranking value is a note or tempo of the musical score.

9. The electronic musical score device as claimed in claim 2, wherein the storage unit stores dynamic symbols for the electronic musical score which are compared with a volume change of the recognized musical scores.

10. An electronic music score device comprising:

an audio unit for receiving a sound signal;

an audio recognition unit for performing an audio frequency recognition process to the sound signal to obtain a recognized musical note;

a page changing unit for generating a page changing control signal;

a storage unit for storing musical score data, at least one predetermined ranking value and the recognized musical note, the musical score data capable of being segmented into at least one page, each page having a plurality of measures and each measure having at least one standard musical note;

a microprocessor unit; and a display unit for displaying at least one page of the musical score data;

wherein the microprocessor receives the page changing control signal, drives the display unit to display another page of the musical score data, and compares the at least one predetermined ranking value to the recognized musical note to generate a ranking result.

11. The electronic musical score device as claimed in claim 10, wherein the page changing unit is at least one touch-control unit for generating the page changing control signal when touched by a user so that the microprocessor drives the display unit to display another page of the musical score data.

12. The electronic musical score device as claimed in claim 10, wherein the page changing unit has at least one light sensor which is used for generating the page changing control signal when the user blocks light so that the microprocessor drives the display unit to display another page of the musical score data.

13. The electronic musical score device as claimed in claim 10, wherein the audio recognition unit has an analog to digital unit and a frequency transformer.

14. The electronic music score device as claimed in claim 10 further comprising a speaker unit, the microprocessor unit controlling the speaker unit to play the recognized musical note stored in the storage unit.

15. The electronic musical score device as claimed in claim 14 further comprising a metronome for generating a tempo, the microprocessor unit working with the storage unit to play the recognized musical note stored in the storage unit via the metronome unit.

16. The electronic musical score device as claimed in claim 10, wherein the at least one predetermined ranking value is a note or tempo of the musical score.

17. An electronic music score device comprising:

an audio unit for receiving a sound signal;

an audio recognition unit for performing an audio frequency recognition process to the sound signal to obtain a recognized musical note;

a page changing unit for generating a page changing control signal;

a storage unit for storing musical score data and the recognized musical note, the musical score data capable of being segmented into at least one page, each page having a plurality of measures and each measure having at least one standard musical note;

a microprocessor unit; and a display unit for displaying at least one page of the musical score data;

wherein the microprocessor receives the page changing control signal and drives the display unit to display another page of the musical score data, and wherein the page changing unit has at least one light sensor which is used for generating the page changing control signal when the user blocks light so that the microprocessor drives the display unit to display another page of the musical score data.

18. The electronic musical score device as claimed in claim 17, wherein the audio recognition unit has an analog to digital unit and a frequency transformer.

19. The electronic music score device as claimed in claim 17 further comprising a speaker unit, the microprocessor unit controlling the speaker unit to play the recognized musical note stored in the storage unit.

20. The electronic musical score device as claimed in claim 19 further comprising a metronome for generating a tempo, the microprocessor unit working with the storage unit to play the recognized musical note stored in the storage unit via the metronome unit.

* * * * *